United States Patent

Aoki et al.

[11] 4,319,813
[45] Mar. 16, 1982

[54] AUTOMATIC FOCUS INDICATING DEVICE FOR CAMERA

[75] Inventors: Harumi Aoki, Kiyose; Yoshio Sawada, Tokyo, both of Japan

[73] Assignee: Asahi Kogaku Kogyo Kabushiki Kaisha, Tokyo, Japan

[21] Appl. No.: 118,889

[22] Filed: Feb. 6, 1980

[30] Foreign Application Priority Data

Feb. 19, 1979 [JP] Japan ................... 54/18574

[51] Int. Cl.³ .................. G03B 7/081; G03B 3/10
[52] U.S. Cl. ................ 354/409 354/25; 354/53; 354/198; 354/289; 250/201
[58] Field of Search ............ 354/25, 31, 53, 60 E, 354/60 R, 72, 195, 198, 289; 355/56; 352/140; 250/201, 204; 350/46; 318/640

[56] References Cited

U.S. PATENT DOCUMENTS

| 3,886,567 | 5/1975 | Matsumoto | 354/25 |
| 4,045,805 | 8/1977 | Saito | 354/25 |
| 4,206,394 | 6/1980 | Flandorfer | 318/640 |

*Primary Examiner*—L. T. Hix
*Assistant Examiner*—S. D. Schreyer
*Attorney, Agent, or Firm*—Sughrue, Mion, Zinn, Macpeak & Seas

[57] ABSTRACT

An automatic focus detecting and indicating device for an camera in which a contrast signal is coupled through first and second analog switches directly to a difference circuit and through a peak hold circuit, respectively. A third analog switch is coupled so as to discharge the value stored in the peak hold circuit. The three switches are operated by a control circuit which in turn operates in accordance with the direction of movement of the lens and the detection of a rising edge of the contrast signal so as to prevent the generation of a false focus signal at other than the point of true focus.

8 Claims, 15 Drawing Figures

AUTOMATIC FOCUS INDICATING DEVICE FOR CAMERA

BACKGROUND OF THE INVENTION

The present invention relates to a device for providing a focus signal at the position of focus of a photographing lens on an object to be photographed in a device which automatically detects focus by detecting the contrast of the image.

It is a fundamental property that the contrast of light and shade of the optical image of an object to be photographed by a photographing lens is maximized when the image of the object is focused. This is due to the fact that the power spectrum (optical intensity) of each spatial frequency of the image of the object becomes a maximum at the point of focus. A variety of automatic focus detecting devices have been proposed which utilize this phenomenon.

Examples of such devices are generally simple in construction. More specifically, in such a device, a contrast detecting photoelectric element is disposed in a plane which is optically equivalent to the surface of a film and a contrast signal is extracted from each object image projecting onto the photoelectric element. The contrast signal thus produced becomes a maximum at the point of focus of the photographing lens. That is, the characteristic curve of amplitudes of the contrast signal as the photographing lens is moved over its range has a single peak. Accordingly, in order for the device to detect the focus position, it is necessary to provide some means for detecting the maximum value of the contrast signal. One example of such means is a measuring instrument with a pointer which is so designed that the deflection of the pointer is in proportion to the magnitude of the contrast signal. With this measuring instrument, the photographer can visually detect the point of maximum contrast from the maximum deflection point of the pointer. However, it is often rather troublesome and difficult for the photographer to detect the maximum deflection of the pointer. If it is possible to produce a focus signal in such a manner that a lamp is turned on with the aid of the focus signal only at the position of focus, then the photographer can readily determine that the photographing lens is focused on an object to be photographed. However, it should be noted that it is difficult to produce such a focalization signal from only a single contrast signal as described above because different contrasts are obtained from different objects within the view of the photographing lens and accordingly the contrast signal produced at the point of focus is not always constant or the signal peak corresponding to the desired object.

Production of a focalization signal from a single contrast signal as described above may be achieved by a device in which the maximum value of a contrast signal is stored as the lens moves in one direction. The stored value and the present contrast signal as the lens is moved reciprocatingly are compared and the focus signal is generated when the two are equal. However, the device suffers from two serious problems. One of the two problems is that, if the photographing lens is moved rearwardly before it reaches the true focus position, the contrast signal shows only an apparent maximum value. That is, a false peak signal is provided in response to which a false focus signal is produced. The other problem is that, before the photographing lens is focused on a new object, it is necessary to reset or clear the contents which have been stored for the previous object.

Because of the above-described difficulties, totally effective focus signals cannot be provided by such conventional devices which simply produce a contrast signal from the image of an object. In order to overcome these difficulties, a variety of improved techniques have been proposed in the art. In one such technique two contrast signals provided by two contrast detecting photoelectric elements which are spaced apart from each other in the direction of the optical axis are compared to obtain a focus signal. In another such device, a single contrast detecting photoelectric element is vibrated in the direction of the optical axis to obtain two contrast signals which are compared to obtain a focus signal similar to the above-described device. However, in such a device in which the contrast signals of two object images spaced in the direction of the optical axis are extracted spatially or with a time division technique are generally large in scale and high in manufacturing cost.

The aforementioned focus signal is a focus indicating signal which is produced in a digital mode at the position of focus. However, it should be noted that the focus indicating signal must be very high in accuracy to be acceptable commercially. Especially with a high grade camera such as a single-lens reflex camera, sharp pictures cannot be obtained without an indicating focus device having a very high accuracy. When pictures are taken with a camera held by hand, the camera is liable to be shaken making it rather difficult to obtain sharp pictures. If, in this case, the focus signal has an extremely high focus indication accuracy, the display of the focus signal may repeatedly turn on and off making the camera difficult for the photographer to use. Accordingly, the focus signal should have a high focus indication accuracy for taking pictures with a camera which is fixed in position. However, the accuracy should not be so high for taking pictures when the camera is held by hand.

Accordingly, an object of the present invention is to provide an automatic focus indicating device in which all of the above-described difficulties have been eliminated and in which the focus signal allowing the light emitting element to operate at the position of focus is produced by extracting a single contrast signal from the image of an object to be photographed. The focus signal should be high in focus indication accuracy for taking pictures when the camera is fixed in position but not so high in focus indication accuracy for taking pictures with the camera held by hand. The device according to the invention is meritorious and effective in that it is compact and low in manufacturing cost and the focus position can be readily determined for taking pictures with a camera held by hand and, furthermore, the focus indication accuracy is considerably high for taking pictures with the camera fixed in position.

SUMMARY OF THE INVENTION

These, as well as other objects of the invention, are met by a device for detecting a focus position and for providing an automatic focus indication in a camera including means for providing a contrast signal from the image of an object to be photographed, a lens direction detector for detecting the direction of movement of the lens of the camera, a peak holding circuit for storing the maximum value of the contrast signal, an attenuator for reducing the value stored by the peak holding circuit, a reset pulse generator circuit which operates in response to the lens direction detector for generating a reset pulse to reset the contents stored in the peak hold circuit, a difference circuit for providing a signal representing a difference between the reduced stored maximum value and the contrast signal, circuit means operating in response to the contrast signal, the lens direction detector and the reset pulse generating circuit <u>for producing a focus signal in proportion to an output of the difference circuit when the contrast signal is greater than the reduced stored maximum value while the lens</u> is moving in the same direction as it was moving when the stored maximum value was originally stored in the peak holding circuit, and means for producing an indication in response to the focus signal substantially at the point of focus.

The reset pulse is produced at the time of starting an extension or retraction of the lens. Preferably the reset pulse generating circuit further operates in association with the shutter button of the camera so that a reset pulse is generated at the time of shutter release. The control circuit means in a preferred embodiment includes means for commencing operation of the peak hold circuit upon production of a reset pulse and continuing until the occurrence of a peak value of the contrast signal. The control circuit means preferably also includes means for commencing operation of the difference circuit so that a difference detection operation is commenced at the time of occurrence of the peak value of the contrast signal. In a preferred embodiment, the lens direction detector includes a slider member positioned and coupled to said lens in such a manner that when the lens is moved the slider also moves on a stationary resistor on which the slider members slide wherein movement of the lens is converted into a resistance value. The indication producing means may, for example, be a light emitting element such as a light emitting diode or a sound producing means either of which is capable of indicating the focus position of the photographing lens on the camera.

DESCRIPTION OF THE PREFERRED EMBODIMENTS

Figure 1:
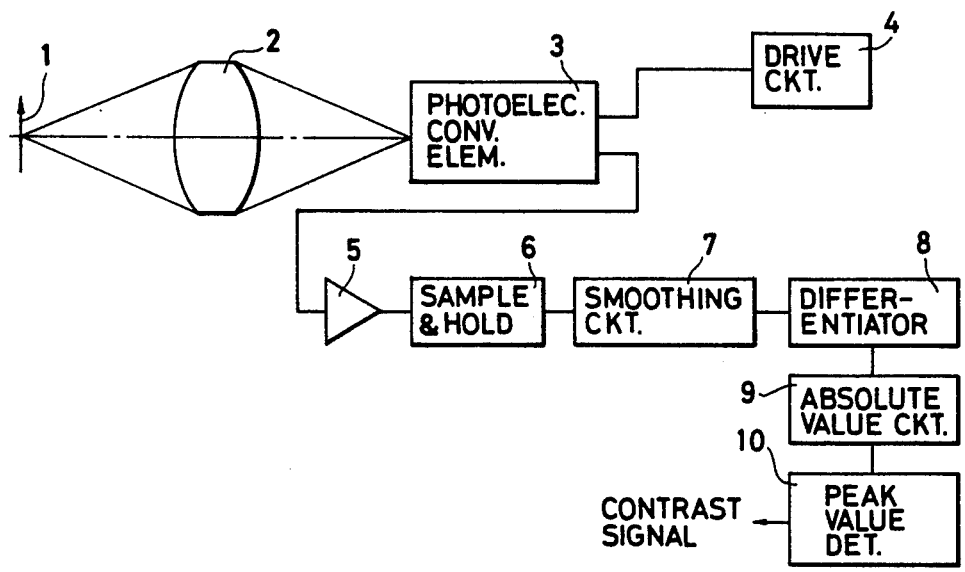
FIG. 1 is an explanatory diagram showing an example of the arrangement of a device for determining a contrast signal from the image of an object to be photographed.

The invention will be described in detail with reference to the accompanying drawings. FIG. 1 shows in block diagram form an example of a device for producing a contrast signal from the image of an object to be photographed. The device employs a self-scanning type photoelectric conversion element as a photoelectric conversion means. The self-scanning type photoelectric conversion element is made up of a plurality of microphotoelectric conversion elements and a scanning circuit. The self-scanning type photoelectric conversion elements may be classified into MOS-FET type devices and CCD type devices depending on the type of scanning circuits employed. These devices are commercially available.

Figure 2:
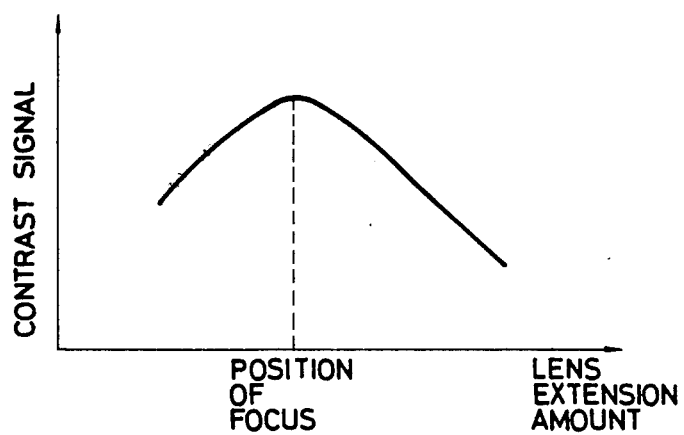
FIG. 2 is a graphical representation indicating a contrast signal which becomes a maximum at the position of focus.

The image of an object 1 to be photographed is formed on a self-scanning type photoelectric conversion element 3 by a lens 2. The self-scanning type photoelectric conversion element 3 is driven by a drive circuit 4 including a scanning pulse generating circuit in such a manner that the image is electrically scanned and a discrete time-series waveform is provided in correspondence with the brightness of the image. The waveform is amplified by an amplifier circuit 5 and is then converted into an analog waveform by a sample-and-hold circuit 6. A smoothing circuit 7 removes unwanted high frequency components from the analog waveform as a result of which the analog waveform is converted into a waveform which corresponds to the distribution of brightness of the image of the object. The waveform thus produced is differentiated by a differentiation circuit 8 whereby a differentiation signal representative of the gradient of the image brightness distribution is produced. The differentiation signal is converted into a positive or negative voltage waveform by an absolute value circuit 9 and the peak value of the absolute value produced during each scanning period is detected by a peak value detecting circuit 10. This peak value is held until another peak value is provided in the subsequent scanning period. The peak value output thus produced is the aforementioned contrast signal. This contrast signal becomes a maximum at the point of focus that is, at the focus position as indicated in FIG. 2.

A variety of devices capable of producing such contrast signals have been proposed in the art. In one example of such a device, a number of microphotoelectric conversion elements are arranged in the plane of an image and the maximum of the difference between the statically detected outputs of adjacent elements is employed as the contrast signal.

Fundamentally, an automatic focus indicating device according to the present invention employs a technique with which the maximum value of the contrast signal described above is stored and when the contrast signal again reaches the value thus stored again, a focus signal is produced.

Figure 3:
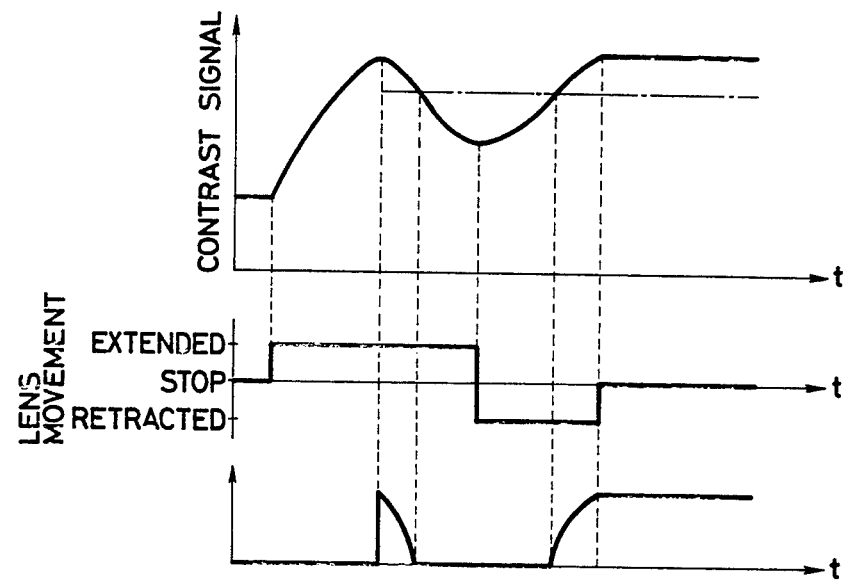
FIG. 3 is a diagram for a description of the basic technique which is employed with the invention to produce a focus signal.

FIG. 3 is a graphical representation for a description of the technique mentioned above. More specifically, the upper part of FIG. 3 indicates variations in a contrast signal while the middle part of FIG. 3 indicates the directions of movement of a photographing lens, that is, it indicates whether the lens is being extended, contracted or is stopped. Specifically, the two parts of FIG. 3 illustrate a sequence of operational steps in which the photographing lens beginning from a stopped position is first extended. When it passes the position where the contrast signal becomes a maximum, it is retracted and when the contrast signal becomes a maximum again, it is stopped.

A specific feature of this invention resides in the fact that a value slightly smaller than the maximum value which is first reached by the contrast signal is stored. This value is referred to as "voltage division peak value" hereinafter when applicable. The value thus stored and the value of the contrast signal are compared and when the latter is larger than the former, a focus signal is produced which then varies with the value of the contrast signal.

In the upper part of FIG. 3, the voltage division peak value is indicated by the dot-chain line. The lower part of FIG. 3 indicates the conditions of the focus signal thus produced. By the utilization of this focus signal, a light emitting element can be turned on at the position of focus or when the lens substantially reaches the focus position.

Figure 4:
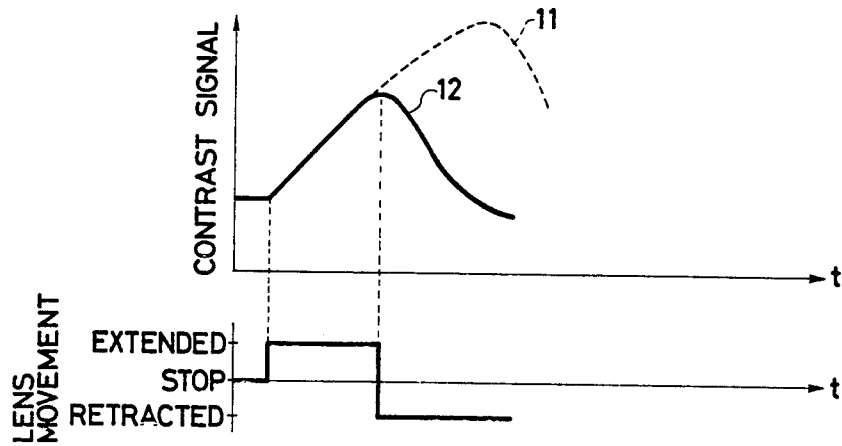
FIG. 4 is a diagram for a description of a false peak which may occur in the contrast signal.

However, it should be noted that if the device is constructed strictly in accordance with the above-described fundamental technique two serious problems arise. One of the problems is that resetting of the maximum value of the contrast signal which has been stored should have been executed. That is, after the maximum value of a contrast signal of an object has been stored, the photographing lens cannot be focused on another object of different contrast. Accordingly, in order to focus the photographing lens on the object, it is necessary to reset the value stored (peak hold reset). The other problem is that, if the lens is moved in an incorrect direction, that is, if the lens is moved rearwardly before the contrast signal becomes a true maximum, then a false maximum value will be obtained as shown in FIG. 4. In FIG. 4, the dotted line 11 indicates the curve of a contrast signal including its true maximum value and the solid line 12 indicates the curve of a contrast signal which is produced when the lens is moved rearwardly before the contrast signal reaches its true maximum value. In the latter case, a false peak lower than the true peak may be provided.

An essential feature of the invention resides in the fact that a determination is made as to whether the photographing lens is being extended or retracted thereby to eliminate the latter problem, that is, to prevent the generation of the focus signal with the false peak. Furthermore, in accordance with the invention, detection of the peak of a contrast signal is suspended upon occurrence of the first peak so as to prevent instability of the focus signal which results when the peak hold level coincides with the contrast signal. In addition, the device according to the invention is provided with a coincidence gate for limiting the period for determining the coincidence of the peak hold level and the contrast signal so that focus signal is produced before the peak is detected.

Figure 5:
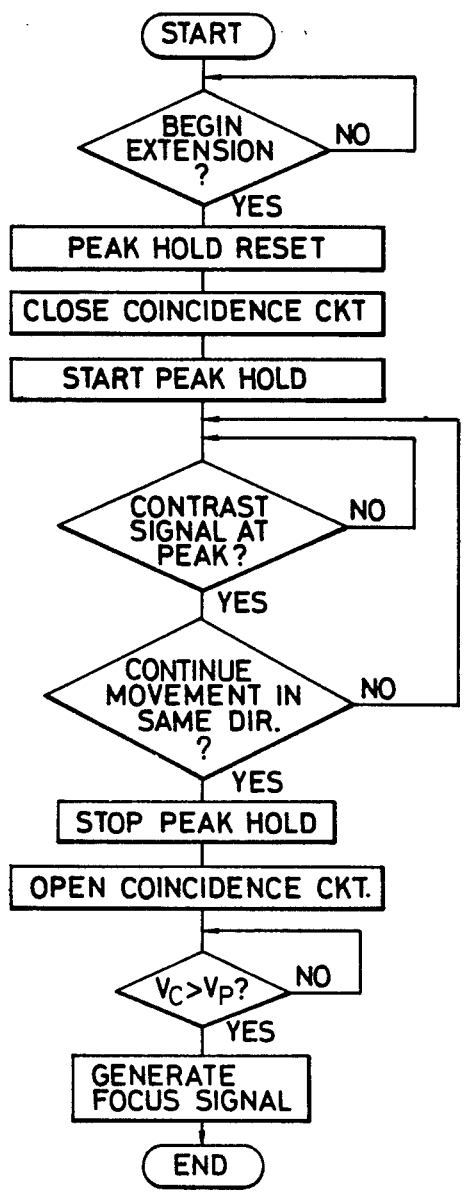
FIG. 5 is a flow chart relating to the operation of an automatic focus indicating device according to the invention.

FIG. 5 is a flow chart indicating the operation of the device according to the invention. In the device, the peak hold reset is carried out when the photographing lens is moving. That is, when the lens is moved, the peak hold level is reset, while the coincidence gate is closed and the peak hold operation is started. When the contrast signal reaches a peak, a determination is made as whether or not the lens is to be moved rearwardly or not. Only when the lens has not been moved rearwardly it is determined that the contrast signal has reached the true peak so that the subsequent processing may be carried out. When the true peak has been detected, the peak hold operation is suspended and the true peak level is maintained. At the same time, the coincidence gate is opened so that the peak level held Vpd is compared with the contrast signal Vc. When $Vc > Vpd$, the lens is substantially focused on the object and the focus signal is produced. This focus signal becomes a maximum when the contrast signal becomes a maximum.

FIG. 6 is an example of a timing chart illustrating the focus indicating operation of the device according to the invention. More specifically, FIG. 6A indicates variations of a contrast signal with respect to the peak hold level the latter being indicated by the dot-chain line. FIG. 6B shows the directions of movement of a photographing lens in correspondence with the variations of the contrast signal. As is apparent from FIGS. 6A and 6B, the photographing lens after being maintained stopped is extended and is then retracted after the contrast signal reaches the peak value. When the contrast signal reaches the peak value, the lens is stopped. Thereafter, the photographing lens is retracted and extended in a similar fashion. FIG. 6C shows a peak hold reset pulse which is generated at the instant when the lens is extended. FIG. 6D is a signal which indicates whether the contrast signal is increasing or decreasing. The signal indicated in FIG. 6D is produced as the output of a slope detecting circuit described later which operates in response to the contrast signal. In FIG. 6D, reference character "H", corresponding to a high logic level, indicates that the contrast signal is increasing or it is at a high logic level while reference character "L" indicates that the contrast signal is decreasing or that it is at a low logic level. FIG. 6E indicates a peak hold operation period during which the peak level at "H" is detected. FIG. 6F indicates a coincidence gate signal. The peak hold level and the level of the contrast signal are compared while the coincidence gate signal is at "H". FIG. 6G shows the focus signal.

Figure 7:
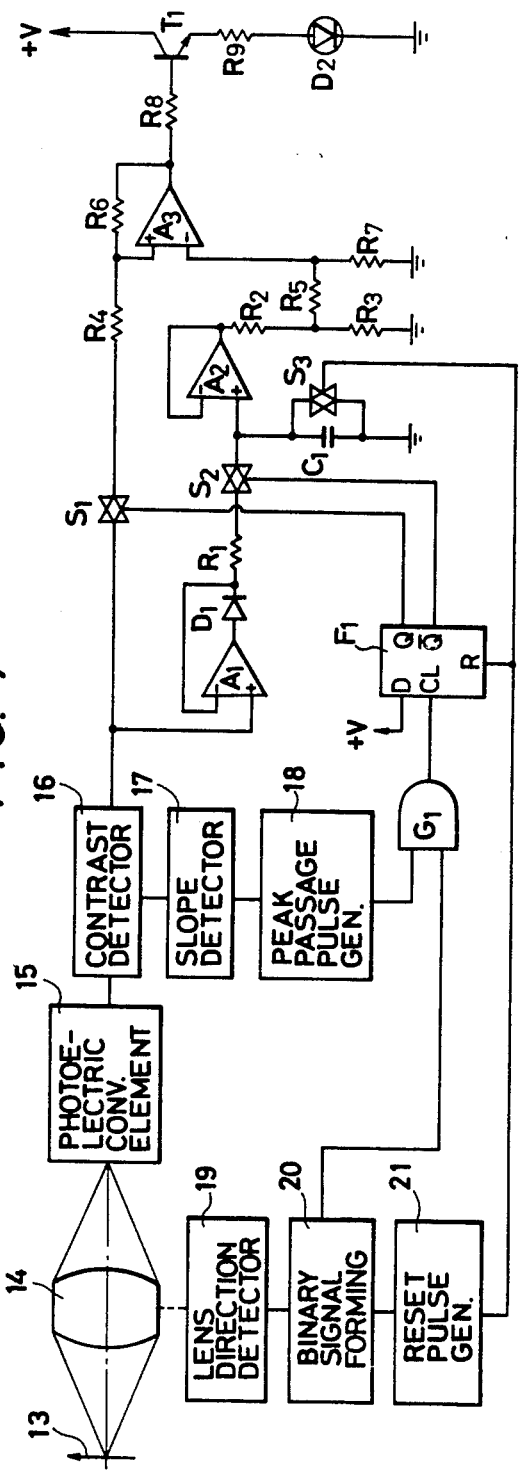
FIG. 7 is a circuit diagram showing an electric circuit in the device of the invention.

FIG. 7 is a diagram of a preferred embodiment of an electrical circuit for the automatic focus detecting device according to the invention. The image of an object to be photographed is formed on a contrast detecting photoelectric conversion element 15 by a photographing lens 14. The contrast signal of the object is produced from the output of the photoelectric conversion element 15 by a contrast detecting circuit 16. This contrast detecting system may be implemented as the device as shown in FIG. 1. However, it may be any such device which is capable of producing a single contrast signal from the image of an object to be photographed. The contrast signal is detected by a slope detecting circuit 17 to determine whether the contrast signal is increasing or decreasing as a result of which a binary signal is generated which is at "H" and "L" when the contrast signal is increasing and decreasing, respectively. When the contrast signal begins to either increase or decrease, a single pulse is generated by a peak passage pulse generating circuit 18. The pulse, termed the peak passage pulse, is applied to an input terminal of an AND circuit $G_1$.

A lens movement direction detecting circuit 19 detects the direction of movement of the lens and drives a binary signal forming circuit 20. As a result, the circuit 20 provides a binary signal which is at "H" when the lens is extended and at "L" when the lens is retracted. The binary signal is applied to the other input terminal of the AND circuit $G_1$. When the aforementioned peak passage pulse is applied to the AND circuit $G_1$ while the lens is being extended or retracted, a pulse waveform appears at the output terminal of the AND circuit $G_1$.

The output waveform of the binary signal forming circuit 20 is applied to a peak hold reset generating circuit 21. A single reset pulse is generated thereby at the start of extension of the lens, for instance. The pulse can be formed by detecting the presence of a rise of the output waveform of the circuit 20.

Figure 6A:
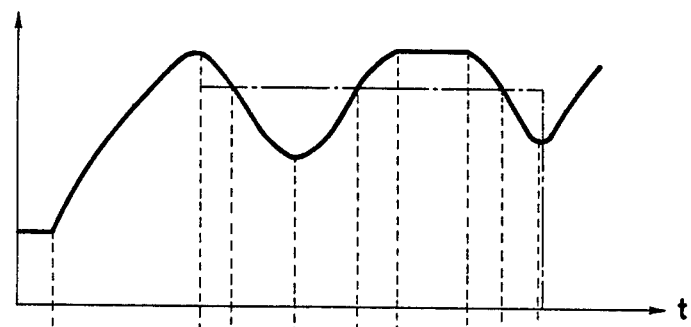
FIGS. 6A through 6G form the basis of a timing chart for a description of the focus indicating operation of the device according to the invention.
Figure 6B:
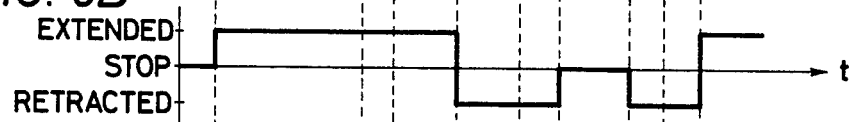
Figure 6C:
Figure 6D:
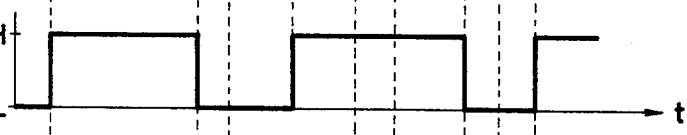
Figure 6E:
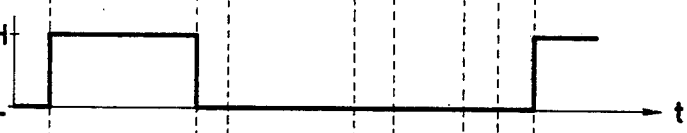
Figure 6F:
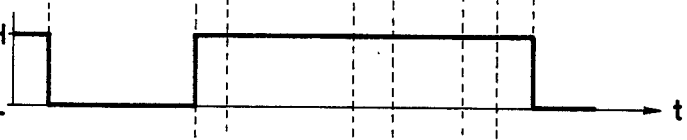
Figure 6G:
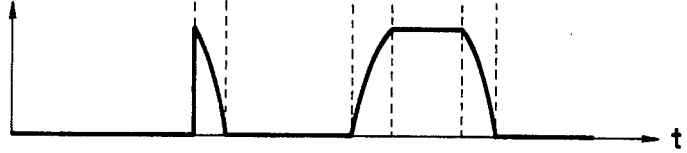

The contrast signal formed by the contrast detecting circuit 16 is applied to a peak hold circuit formed with an operational amplifier $A_1$, a diode $D_1$, a resistor $R_1$ and a capacitor $C_1$ to detect the peak value of the signal. The peak signal held, after passing a buffer amplifier provided as an operational amplifier $A_2$, is subjected to voltage division by resistors $R_2$ and $R_3$ and the difference between the voltage division peak value and the present instantaneous value of the contrast signal is determined by a differential amplifier provided as an operational amplifier $A_3$. For the signals subjected to comparison, the contrast signal is applied to the comparator under the control of an analog switch $S_1$ while the peak signal held is applied to the comparator via amplifier 8 and the voltage divider circuitry. That is, application of these signals is controlled by operation of the analog switches $S_1$ and $S_2$ which are in turn controlled by the outputs of a D-type flip-flop circuit $F_1$. The flip-flop circuit $F_1$ is operated by the peak hold reset pulse applied to its reset terminal R and the peak passage pulse applied to its clock input terminal CL as a result of which the outputs as shown in FIGS. 6E and 6F are provided at the output terminals $\overline{Q}$ and Q, respectively. The capacitor $C_1$ is charged to the peak value and is discharged by the operation of an analog switch $S_3$ which is controlled by the peak hold reset pulse to reset the peak signal held.

When the output of the differential amplifier is positive, that is, when the magnitude of the contrast signal is higher than the voltage division peak value, the output is a control signal which renders a transistor $T_1$ conductive. As the differential output increases, current flows between the collector and the emitter of the transistor $T_1$. When the transistor $T_1$ is rendered conductive, current also flows in a light emitting diode $D_2$ as a result of which the light emitting diode $D_2$ emits light. Thus, the light emitting element is turned on substantially at the position of focus. Moreover, the brightness of the light emitting element will be at a maximum when the lens is focused on the object. In the above-described example, the voltage division peak value is obtained with the resistor voltage divider but it may also be produced with a voltage attenuator.

Figure 8:
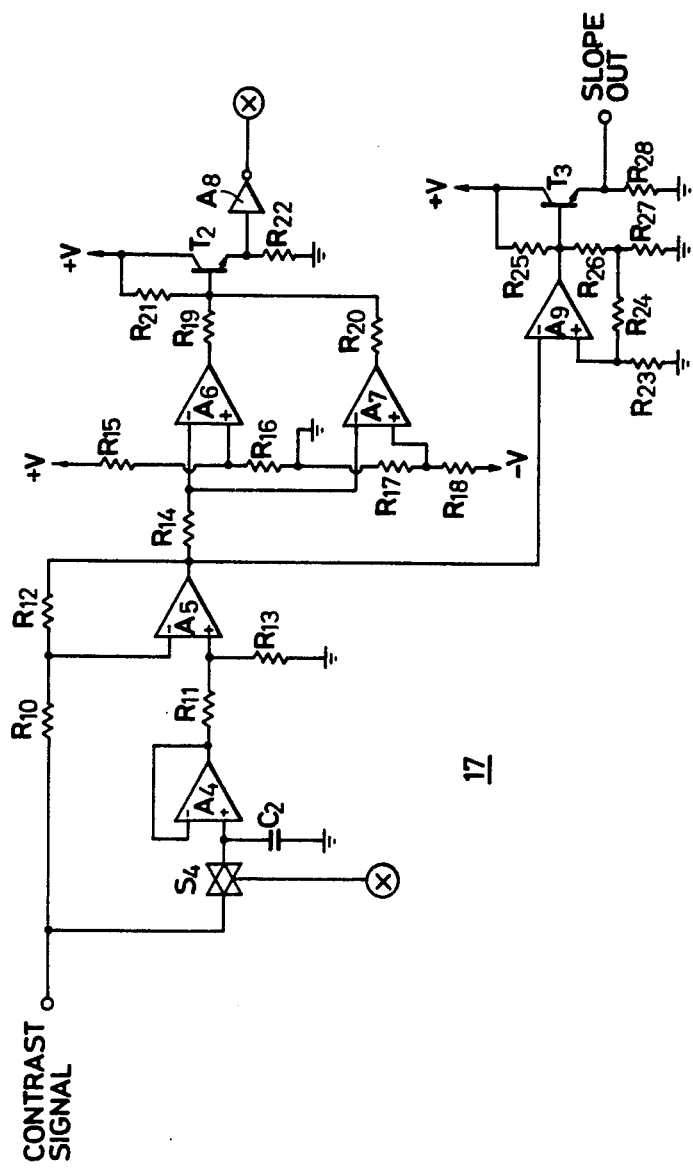
FIG. 8 is a circuit diagram showing an example of a slope detecting circuit in the device of the invention.

FIG. 8 is a circuit diagram of an example of the slope detecting circuit 17 in FIG. 7. The contrast signal provided by the contrast detecting circuit 6 is sampled and held by a buffer amplifier composed of an operational amplifier $A_4$, an analog switch $S_4$ and a capacitor $C_2$. The voltage difference between the signal thus sampled and held and the contrast signal applied through a resistor $R_{10}$ is obtained by a differential amplifier provided as an operational amplifier $A_5$. A window comparator composed of operational amplifiers $A_6$ and $A_7$, a transistor $T_2$ and an inverter $A_8$ convert the voltage difference thus obtained into a digital signal which is at the "H" level when the voltage difference exceeds either one of predetermined positive and negative threshold values. This digital signal controls the analog switch $S_4$.

The output of the differential amplifier is applied to a hysteresis comparator, namely an operational amplifier $A_9$, where it is detected to determine whether the voltage difference exceeds the positive threshold value or the negative threshold value thus providing a binary signal whose level is set to "H" when the contrast signal is increasing and to "L" when the control signal is decreasing.

Figure 9:
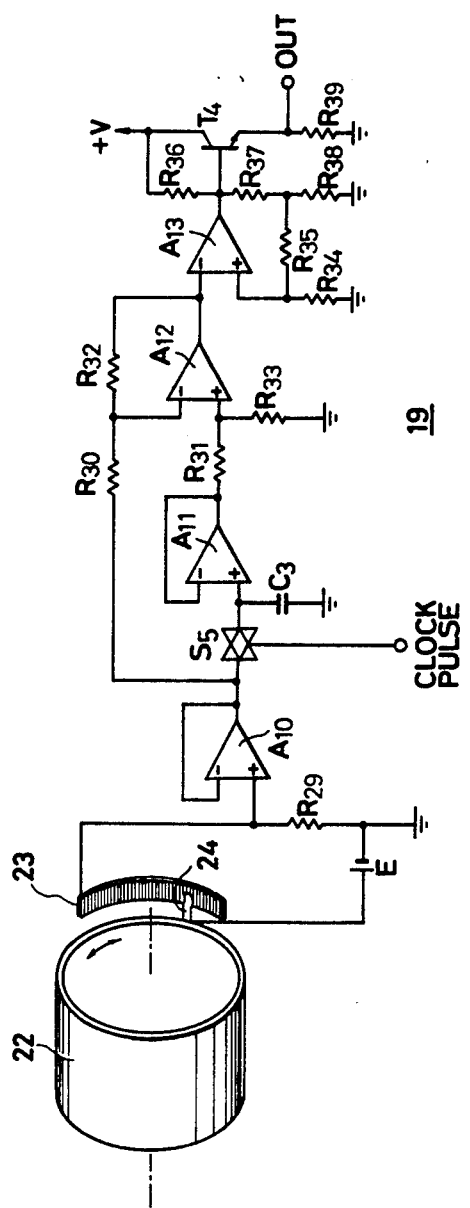
FIG. 9 is an explanatory diagram, partly as a circuit diagram, showing an example of an lens direction detector in the device of the invention.

FIG. 9 is a circuit diagram of a preferred example of the lens direction detector described above. A lens 22 is provided with a slide or wiper 24 which slides on a stationary resistor 23 as the lens 22 rotates. That is, the lens 22 is provided with a variable resistor whose wiper is moved as the lens rotates. Accordingly, as the lens rotates, the resistance between the slider 24 and one end of the resistor 23 changes. As a power source E and a resistor $R_{29}$ are connected to the variable resistor as shown in FIG. 9, the voltage across the resistor $R_{29}$ varies as the lens rotates. This voltage is applied through a buffer amplifier implemented as an operational amplifier $A_{10}$ to a sample-and-hold circuit composed of an analog switch $S_5$ and a capacitor $C_3$. The voltage difference between the sampled-and-held signal and the direct signal is produced by a differential amplifier including an operational amplifier $A_{12}$. In order to drive the sample-and-hold circuit a train of pulses generated by a suitable clock pulse generator is applied to the sample-and-hold circuit. The voltage difference thus obtained is applied to a circuit composed of a hysteresis comparator including an operational amplifier $A_{13}$ and a transistor $T_5$ where it is converted into a binary signal whose level is "H" when the voltage difference exceeds a predetermined positive threshold value and to "L" when it exceeds a predetermined negative threshold value. Thus, the binary signal is a digital signal which assumes one of two respective values in response to the extension and retraction of the lens. In the example shown in FIG. 9, variation of a resistance is utilized. However, variations in magnetism or in luminous flux may be employed for the detector 19.

As is apparent from the above description, with the automatic focus indicating device according to the invention, the focus signal is produced at the position of focus using a device for detecting a contrast signal with respect to an object image and a device for detecting the direction of movement of the lens.

Therefore, the automatic focus indicating device according to the invention is simpler in construction and lower in manufacturing cost than a conventional device in which, for instance, the contrast signals of more than two object images spaced from each other in the direction of optical axis are detected.

As the device of the invention includes means for detecting the direction of movement of the lens, the provision of a false peak value different from the true peak value of the contrast signal at the true focus position is prevented. This is one of the significant merits of the invention. Furthermore, as the reset pulse for resetting the peak signal held can be provided with the lens direction detector, a camera incorporating a focus indicating device of the invention can be easily operated and is free from erroneous operation which results when the peak hold signal is not reset. This is another merit of the invention.

The reset pulse may be provided by utilizing other components of the camera as the case may be. For instance, the peak hold signal may be reset at the time of shutter release in association with the operation of the shutter button.

In the device of the invention, the focus signal is produced with high accuracy at the point of focus. Therefore, when taking a picture with the camera hand held, the display of the focus signal is maintained unchanged even when the camera is shaken. That is, the focus signal is displayed satisfactorily at all times. Furthermore, in the case where the camera is fixed in position so as to permit the taking of a sharp picture with the lens precisely focused on an object, the picture can be very precisely focused by detecting the position where the focus signal becomes a maximum. Thus, the automatic focus indicating device according to the invention is practical in use, because the focus signal is varied in an analog mode with a very satisfactory focus indication accuracy and the position where the focus signal becomes a maximum is the intended focus position of the lens.

The focus signal can be utilized for turning on a light emitting element such as a light emitting diode in such a manner that the brightness thereof is varied in an analog mode as described above or for producing sound in such a manner that the pitch or loudness thereof is varied in an analog mode. Therefore, an automatic focus indicating camera which is simple in operation and high in focus indication accuracy can be provided according to the invention.

What is claimed is:

1. A device for detecting a focus position and for providing an automatic focus indication in a camera comprising: means for providing a contrast signal from the image of an object to be photographed; a lens direction detector for detecting the direction of movement of a lens; a peak hold circuit for storing the maximum value of said contrast signal; an attenuator for reducing said value; a reset pulse generating circuit operating in response to said lens direction detector for generating a reset pulse to reset contents stored in said peak hold circuit; a difference circuit for providing a signal representing a difference between the reduced stored maximum value and said contrast signal; control circuit means operating in response to said contrast signal, said lens direction detector and said reset pulse generating circuit for producing a focus signal in proportion to an output of said difference circuit when said contrast signal is greater than said reduced stored maximum value with said lens moving in the same direction as that when said stored maximum value was stored; and means for producing an indication in response to said focus signal substantially at the point of focus.

2. The device as claimed in claim 1 wherein said reset pulse is produced at the time of starting of said lens in said same direction.

3. The device as claimed in claim 1 wherein said reset pulse generating circuit is additionally operated in association with the shutter button of said camera wherein said reset pulse is generated at the time of shutter release.

4. The device as claimed in claim 1 wherein said control circuit means comprises: means for commencing operation of said peak hold circuit upon production of a reset pulse and continuing to occurrence of a peak value of said contrast signal and means for commencing operation of said difference circuit so that a difference detection operation thereof is started at the time of occurrence of said peak value of said contrast signal.

5. The device as claimed in claim 1 wherein said lens extension direction detector comprises: a slider so mounted on said lens as to be moved by movement of said lens and a stationary resistor on which said slider slides wherein movement of said lens is converted into resistance.

6. The device as claimed in claim 1 wherein said indication producing means comprises: a light emitting element to indicate said focus position.

7. The device as claimed in claim 1 wherein said indication producing means comprises: means for producing sound to indicate said focus position.

8. The device as claimed in claim 1 wherein said peak hold circuit includes detecting means for detecting said maximum value of said contrast signal and holding means for storing said detected maximum value, and wherein said control circuit means comprises: first switch means operatively coupled between an output of said contrast signal providing means and a first input of said difference circuit; second switch means operatively coupled between said detecting means and said holding means; third switch means operatively coupled to reset said peak hold circuit; a flip-flop circuit, a reset input of said flip-flop circuit and a control input of said third switch means being coupled to an output of said reset pulse generating circuit to receive said reset pulse, one output of said flip-flop circuit being coupled to a control input of said first switch means and a complementary output of said flip-flop circuit being coupled to a control input of said second switch means; a slope detector having an input coupled to an output of said contrast signal providing means for producing a signal in response to a predetermined one of a rising and falling edge of a contrast signal; and an AND gate having one input coupled to receive a signal produced in response to an output of said slope detecting means and a second input coupled to receive a signal produced in response to said lens direction detector and having an output coupled to a clock input of said flip-flop circuit.

* * * * *